Jan. 30, 1968 A. H. MENGEL 3,366,434

METHOD FOR REJUVENATING AN IMAGE ORTHICON TUBE

Filed Oct. 21, 1966

INVENTOR
ARTHUR H. MENGEL
BY B. T. Wobensmith 2nd
ATTORNEY

United States Patent Office 3,366,434
Patented Jan. 30, 1968

3,366,434

METHOD FOR REJUVENATING AN IMAGE ORTHICON TUBE

Arthur H. Mengel, Laureldale, Pa., assignor to Teltron, Inc., Boyertown, Pa., a corporation of Pennsylvania Continuation-in-part of application Ser. No. 405,495, Oct. 21, 1964. This application Oct. 21, 1966, Ser. No. 588,556
4 Claims. (Cl. 316—1)

ABSTRACT OF THE DISCLOSURE

A method of rejuvenating an image orthicon tube which comprises impinging light on the photocathode and simultaneously applying a high voltage to selected portions of the tube so that the electron scanning beam is speeded up to etch the target, thereby removing raster burn and restoring the tube to proper operating condition.

This application is a continuation-in-part of my prior application Ser. No. 405,495 filed Oct. 21, 1964.

This invention relates to a method for rejuvenating image orthicon tubes and more particularly to such a method whereby the useful life of the tube is greatly extended and its operational efficiency improved.

Image orthicon tubes are used most often in television cameras and provide the vehicle whereby the scene to be televised is changed from light levels into electrical impulses. The normal black and white camera uses one such tube, while a color camera uses three tubes each of which transmits one of the basic colors of blue, green and red.

Such tubes are difficult to manufacture and the rejection rate has been as high as 50% with the result that the tubes are very expensive.

Image orthicon tubes develop certain faults from use which result in a decrease in their efficiency and necessitate their frequent replacement. Some of these faults which the present invention seeks to remedy are target blemishes commonly known as raster burn, prolonged image retention, decreased photocathode sensitivity and decreased secondary emission of the gun side of the target resulting in loss of overall sensitivity of the tube.

The principal object of the present invention is to provide a method for rejuvenating an image orthicon tube that removes raster burn from the tubes' target.

A further object of the present invention is to provide a method for rejuvenating an image orthicon tube that restores photocathode sensitivity.

A further object of the present invention is to provide a method for rejuvenating an image orthicon tube whereby the tube can be rejuvenated without removal from the television camera.

A further object of the present invention is to provide a method for rejuvenating an image orthicon tube whereby the resistivity and dielectric characteristics of the target are restored and in many instances improved over their original values.

A further object of the present invention is to provide a method for rejuvenating an image orthicon tube wherein the rejuvenation will cause the tube to operate for a longer period between treatments than a new tube.

Other objects and advantageous features of the invention will be apparent from the description and claims.

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

Figure 1:
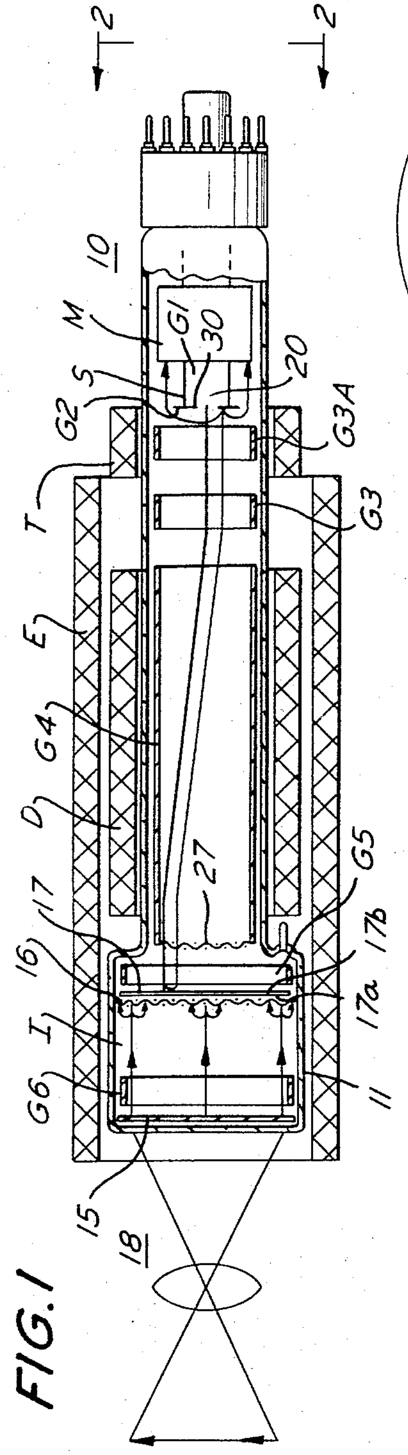
FIG. 1 is a longitudinal sectional view of a representative image orthicon tube illustrating its component parts.
Figure 2:
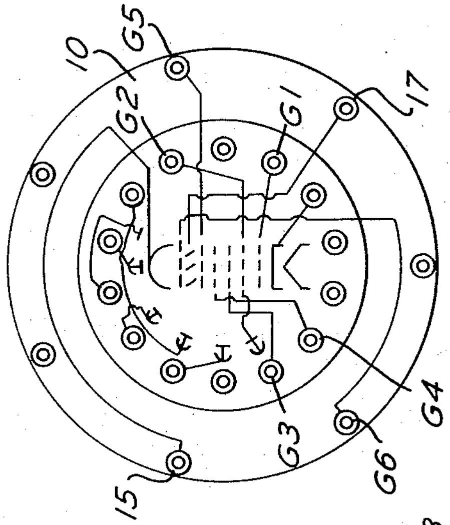
FIG. 2 is a vertical sectional view, enlarged, taken approximately on the line 2—2 of FIG. 1; and, FIG. 3 is a schematic diagram illustrating one form of circuitry for carrying out the present invention and showing the connections for an image orthicon tube.
Figure 3:
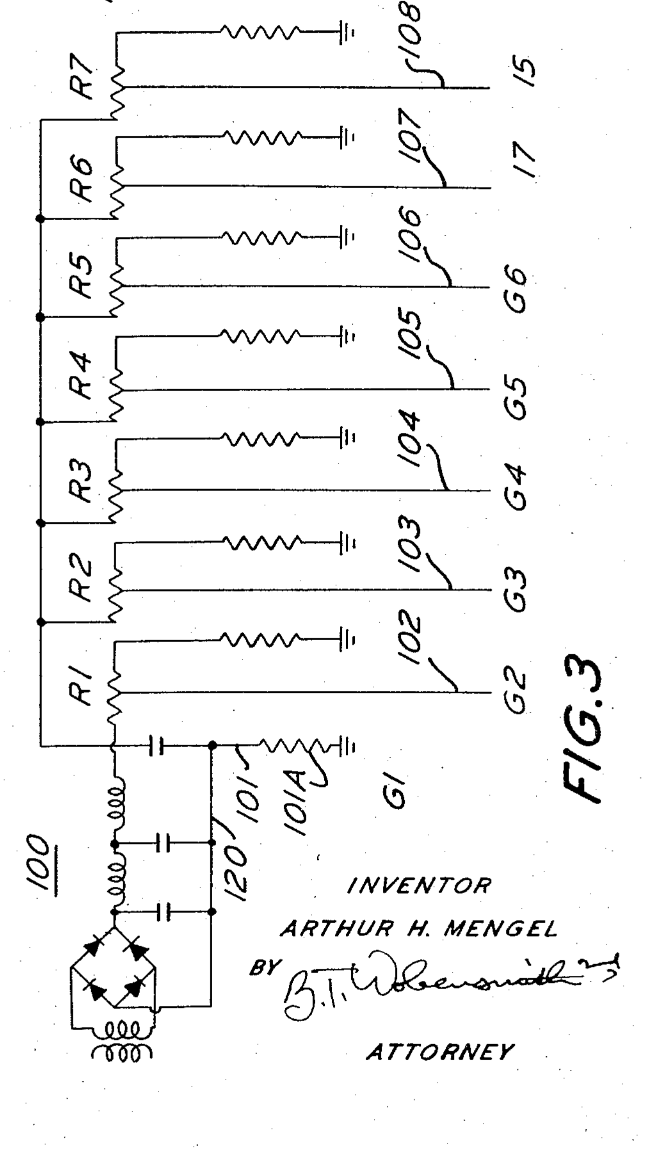

Referring now more particularly to the drawings and FIGS. 1 and 2 thereof an image orthicon tube 10 of well known type is there illustrated and will be described so that the method of the invention will be more readily understood. The image orthicon tube consists of three basic portions which are known respectively as an image portion I, a scanning portion S, and a multiplier portion M, all of which are enclosed in a sealed glass envelope 11.

The image portion which is at the forwardmost end of the tube 10, and is denoted generally as I includes a semitransparent cesium composition photocathode 15, a fine target mesh 16 and a thin glass disc target 17. An electrostatic accelerator grid G6 is provided between the photocathode 15 and the target 17 perpendicular thereto and extending around the inside surface of the glass tube envelope 11. An optical system 18 of well known type is provided in front of the image portion I and is used for conveying the televised scene onto the front of the photocathode 15.

Light from the scene to be televised is picked up by the optical system 18 and focused on the photocathode 15 which emits electrons to its rear in an amount depending on the intensity of the light striking each portion of the photocathode.

The stream of electrons are accelerated by the electrostatic field generated by grid G6 and pass through mesh 16 to strike the front 17*a* of target 17.

The stream of electrons striking the front 17*a* of target 17 causes the target 17 to emit secondary electrons which are attracted and collected by the target mesh 16 which is in front of target 17 and which is held at a voltage such that a small potential difference exists between the target 17 and the mesh 16.

This electron emission causes the front or surface of the photocathode side 17*a* of target 17 to be left with a series of charges which describe a pattern corresponding to the light from the scene being televised.

Due to the thinness of glass target 17 it acts as a dielectric and a pattern of charges is set up on its rear side 17*b* corresponding to the pattern on the front or photocathode side 17*a*.

This charge pattern on side 17*b* is scanned by a low velocity electron beam from an electron gun 20 of the scanning portion S of the tube 10.

The scanning portion S of the tube 10 with its electron gun 20 further includes a control grid G1 and an accelerating grid G2. The electron gun 20 contains a thermionic cathode (not shown) and cathode heaters (not shown) of well known construction.

The electron beam from electron gun 20 which scans the rear side of target 17 is focused on target 17 by the magnetic field from an external coil E and the electrostatic field of a grid G4.

The beam is deflected horizontally and vertically by external deflecting coils D, and is longitudinally aligned by a transverse magnetic field produced by coils T located at the electron gun end of the tube 10.

The grid G4 is of cylindrical shape open at the electron gun end and at the target end is closed by a fine field mesh screen 27. An additional circumferential grid G5 is provided between the field mesh screen 27 and the target 17 which produces an electrostatic field which in conjuntion with the field mesh screen 27 slows down the electron beam from the electron gun 20.

The electron beam electrons approach the target 17 perpendicularly and at very low velocity due to the action of the mesh screen 27 and grid G5 which results in a sharp image and a defocusing of the imposed pattern from the cathode of the electron gun 20.

The stream of electrons are turned back at the target 17 in proportion to the charge pattern on the rear 17*b* of the target 17 and are deflected through the mesh screen 27 to a first dynode 30 of the multiplier portion M of the tube 10.

A suppressor grid G3 is provided between the grid G4 and the dynode 30, the field produced by the grid G3 refocuses the electron stream so that unwanted secondary electron effect is eliminated.

A collector grid G3A is provided between the grid G3 and the electron gun 20, the grid G3A facilitates secondary electron collection by the successive dynodes in the multiplier portion M.

The multiplier portion M utilizes the principle of secondary emission to amplify the beam electron current more than 500 times. The electrons impinging on the second dynode (not shown) are assisted by grid G3A in the multiplication process and their travel to several other dynodes (not shown) are collected by an anode (not shown) and removed from the tube 10 at the rear thereof for transmission by well known electronic equipment.

The above description of a representative image orthicon tube forms no part of the present invention but is given to illustrate the operation of a typical tube upon which the method of rejuvenation is to be performed.

It should be noted that under normal operating conditions the electron beam is of low velocity and density. In addition the target 17 is held at 0 volt potential to further reduce the velocity of the electron beam from the electron gun 20 of the scanning portion S of the tube 10.

The apparatus for carrying out the present invention includes a power supply 100 of conventional type which is illustrated as being of 600 volt D.C. capacity.

The power supply 100 has a plurality of leads which are connected to various parts of the tube 10.

Ground conductors 101 and 101*a* are connected respectively to grid G1 and cathode (not shown) of the electron gun end of the tube and to lead 120 of power supply 100.

Conductor 102 connects grid G2 through a variable resistor R1 to the power supply 100. Conductor 103 is connected to grid G3 and to the power supply 100 through a variable resistor R2. Conductor 104 connects grid G4 through a variable resistor R3 to the power supply 100. Conductor 105 is connected to grid G5 and to the power supply 100 through a variable resistor R4, conductor 106 connects grid G6 through a variable resistor R5 to the power supply 100. Additional conductors 107 and 108 are provided connected respectively to the target 17 and the photocathode 15 through variable resistors R6 and R7.

In operation the power supply 100 is activated and the variable resistors R1, R2, R3, R4, R5, R6, and R7 are adjusted so that a voltage of about 500 volts D.C. is supplied to the target 17 photocathode 15 and grids G2, G3, G4, G5, G6 and G7.

It has been ascertained that for the purpose of the invention about 500 volts D.C. is an optimum voltage to be applied to the grids, however any voltage of about 100 to about 5,000 volts can be utilized if desired.

Illumination of about 50 foot-candles is provided so that light impinges on the photocathode 15 of the tube 10 to cause electrons to be emitted and strike the front 17*a* of the target 17. This level is necessary in order to reduce the capacitive effect of the target 17 acting with mesh 16, so that the target 17 does not attract the mesh 16 and be shattered.

A voltage of about 6.3 volts is applied to the cathode heaters in order to have the thermionic cathode emit a stream of electrons.

The thermionic cathode (not shown) and grid G1 are held at 0 volts potential, in order that the cathode emission be at maximum. If desired, a negative potential can be applied to the grid G1 however if the beam is much reduced in density the target becomes charged and ages rapidly, rendering the tube unuseable.

With a voltage of about 500 volts being supplied to the tube connections, the electron beam from the gun 20 is considerably speeded up and etches the target face 17*b* of the target 17.

The raster burn on the gun side 17*b* is eliminated as the surface of the target 17 is eaten away by the electron beam and clear glass is exposed.

This treatment can be continued for as long as is needed to remove the raster burn. With a voltage supply of 500 volts D. C. about two hours of treatment has produced favorable results.

It is thought that the raster burn results from the action of the sodium in the glass of the target 17 coming to the surface and oxidizing due to the small amounts of oxygen released during normal tube operation.

This contamination or raster burn is responsible for image retention, loss of resistivity and loss of efficiency of the tube so that removal of this surface burn serves to eliminate these problems.

The action of the beam during the etching process appears to release oxygen which reacts with the Bi-Ag-O-Cs photocathode 15 to oxidize the photocathode and improve its light sensitivity. In addition the etching of the target 17 reduces its thickness and its functions better as a dielectric.

It has been observed that gases are freed by this process and adsorbed or gettered by the metal elements of the tube. In order to obtain stability it is preferred that the tube not be placed into normal operation for at least 24 hours.

If desired the voltages referred to above may be increased in which case etching is speeded up, and the treatment time is reduced, however there is danger of burning a hole through the target 17 and rendering it useless. The use of voltages below 100 volts will not sufficiently etch the target so as to remove the raster burn and are not recommended.

I claim:

1. The method of rejuvenating an image orthicon tube in which said tube has a target, a target mesh, a photocathode, an emitter providing an electron scanning beam and controlling and accelerating grids for the emitter which comprises applying direct current potentials within the tube to cause the beam to be accelerated, impinging light on said photocathode while said potentials are being applied, and scanning and etching the target with said beam to remove the contamination therefrom and thereby rejuvenating the tube.

2. The method of rejuvenating an image orthicon tube as defined in claim 1 in which said potentials are in the range from 100 to 5000 volts.

3. The method of rejuvenating an image orthicon tube as defined in claim 1 in which said emitter is held at maximum output.

4. The method of rejuvenating an image orthicon tube as defined in claim 2 in which said potentials are 500 volts.

References Cited

UNITED STATES PATENTS

| | | | |
|---|---|---|---|
| 2,413,707 | 1/1947 | Helliar | 316—2 |
| 2,597,383 | 5/1952 | Samuel | 316—1 |

RICHARD H. EANES, JR., *Primary Examiner.*